UNITED STATES PATENT OFFICE.

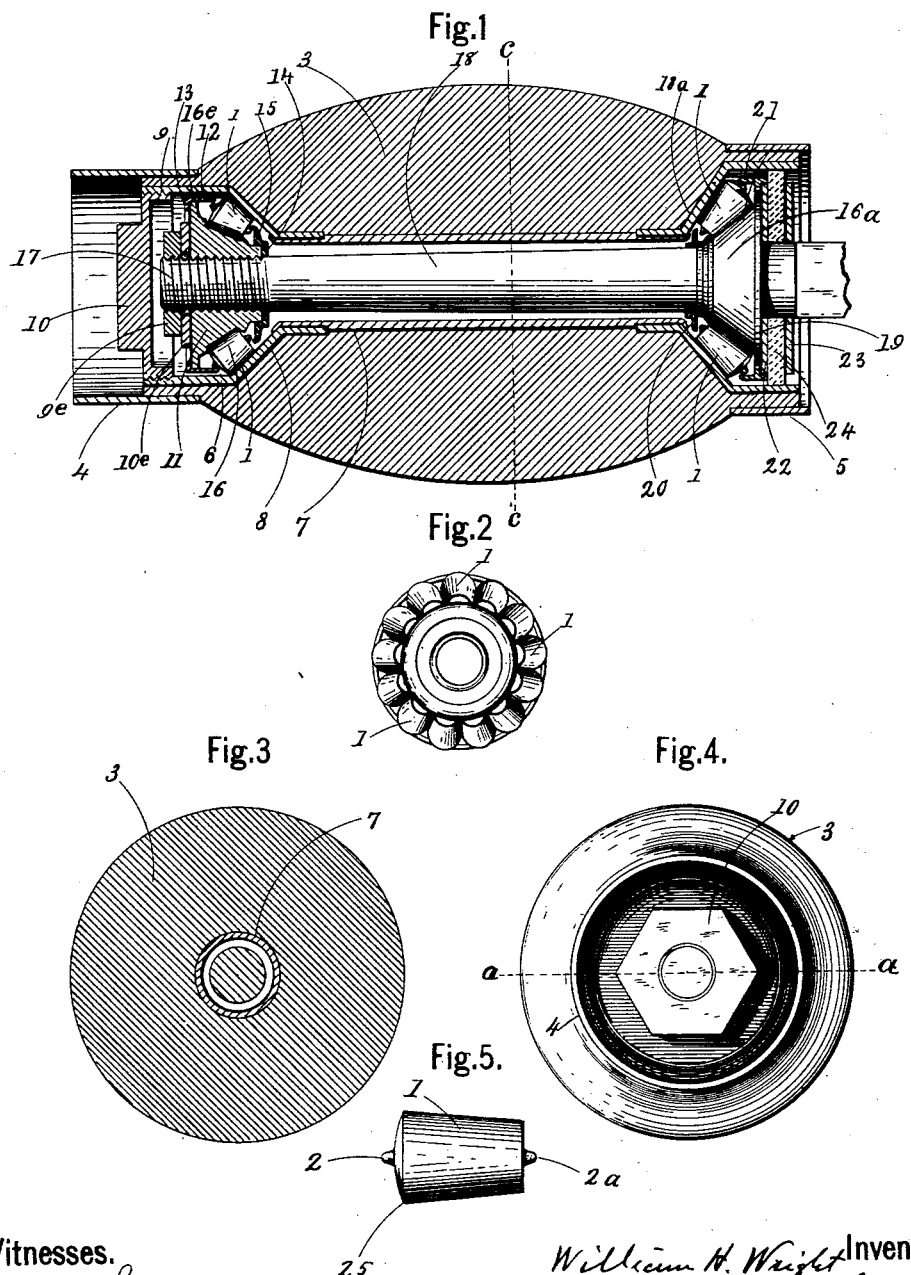

WILLIAM H. WRIGHT, OF BUFFALO, NEW YORK.

ANTIFRICTION-BEARING.

SPECIFICATION forming part of Letters Patent No. 541,196, dated June 18, 1895.

Application filed April 4, 1894. Serial No. 506,272. (No model.)

*To all whom it may concern:*

Be it known that I, WILLIAM H. WRIGHT, a citizen of the United States, residing in Buffalo, in the county of Erie and State of New York, have invented certain new and useful Improvements in Antifriction-Bearings, of which the following is a specification.

The object of my invention is to provide a nearly frictionless bearing for bicycles, carriages or other vehicles requiring an easy running bearing, and the invention relates, first, to the form and construction of the tapering rollers; second, to a suitable means for retaining the tapering rollers in their proper position within the bearing so that in case the bearing should be removed the rollers will remain in position within, without falling out even if the bearing is reversed or its position otherwise changed; third, my invention relates to certain details of construction, all of which will be fully and clearly hereinafter described and claimed, reference being had to the accompanying drawings, in which—

Figure 1 represents a longitudinal section on or about line $a\ a$, Fig. 4, cutting through the hub of a carriage-wheel, also through the bearing-cases and other parts of the device. Fig. 2 represents a detached face view of one of the bearing-cases, showing the tapering rollers in position within the holding-case. Fig. 3 is a cross-section through the hub, the sleeve for connecting the bearing-cases, and the axle-journal. Fig. 4 represents an end view of the hub, showing an outside end view of the device connected with it. Fig. 5 is an enlarged side elevation of one of the tapering rollers.

In carrying out my invention I use a series of tapering rollers, preferably of hardened cast steel, 1, each having at their large ends a projecting holding portion 2, and at the small end, a similar holding portion $2^a$. The object of these holding portions is to provide the means whereby they can be secured in place without danger of falling out when the bearing containing them is removed or its position changed in any way as will appear farther on.

In the drawings, Figs. 1 to 3 and 4, I have shown the invention as applied to a carriage hub for the purpose of illustrating the same but these tapering rollers are adapted for use in bicycle or other bearings. Referring to said drawings, 3 represents the hub of an ordinary carriage. It is provided with the usual protecting rim-bands 4 and 5. The front bearing 6, is secured in any well known way to a sleeve 7, and is made tapering at the point 8, and provided at its front or larger end, with an inside screw thread 9, in which is secured the nut 10, thereby making the interior of the bearing-case perfectly air tight at the end of the hub. The tapering portion 8, forms one of the inside bearing surfaces for the tapering rollers, and the tapering nut 11, forms the other bearing. On the tapering nut 11 is secured at the large end a rim 12, having an inside projecting flange 13, which rests against the back of the nut and prevents the rim-band from being shoved too far forward so that the projecting parts 2, are just under the inner edge of the rim. On the smaller end of the nut 11, is also a rim-band 14, having a surrounding flange 15, that curves in slightly toward the end of the roller 1, so as to catch over and securely hold the projecting portion $2^a$, of said roller.

It will be noticed that the tapering nut 11, is provided with a surrounding depression 16, similar to the depression $16^a$, in the opposite end of the bearing, in which the tapering rollers roll and are thereby prevented from moving lengthwise either way.

The nut 11, with all its rollers and other parts is adapted to screw on to the screw threaded portion 17, of the axle 18, substantially as shown in Fig. 1. After the nut 11, is put on it is secured by a jam nut $9^e$. A washer $10^e$, made in the usual and well known way with a little inward projection to fit into a groove in the screw threaded portion 17, so that it cannot turn is first put on and then the jam nut is brought up tight, thereby making everything rigid. The holding portions 2 and $2^a$, are therefore simply retaining portions. They do not act as journals and when in operation they do not even touch their retaining rim bands 12 and 14, except when the nut 11, and its bearing rollers are removed, the only object of the retaining portions being to keep the tapering rollers from getting out of place when the nut 11, with its several parts are removed from the journal. The rim bands 12 and 14, are secured by being fitted tightly and forced to their places on the nut so that they cannot be easily removed. Consequently when the nut is taken out, for oiling the journal, or for any purpose the whole remains intact and the rollers are not liable to drop out and be lost. This is an important advantage inasmuch as it saves time when oiling the journal. If the rollers should drop out, or were not retained in place it would be impossible to put the device back in place in the hub, unless the carriage was turned over on its side which would be impracticable.

The tapering rollers it will be noticed, are made convex at the large end terminating in a sharp corner or edge 25, and flat at the smaller end. The object of this construction is to give that part of the roller a bearing against the shoulder $16^e$, of the depression 16, or bearing seat, so that the roller bears fairly against it and is not liable to climb up over it. This is an important construction, because if that end of the roller was flat it would be inclined to cut and jam up on the shoulder and bind which action would soon destroy the journal. If that end of the roller was flat and the corners rounded it would then have a tendency to cut and climb up out of its bearing, a construction which practice has shown to be seriously objectionable. At the opposite end of the sleeve 7, is another tapering bearing-case $18^a$. It is rigidly secured to the sleeve by being slipped on the end of the sleeve and expanded as shown, and forms the inner bearing for the tapering rollers, the other bearing being formed by the tapering solid bearing 19, having a surrounding depression $16^a$, for the rollers 1, to roll in and be kept from moving longitudinally.

The bearing 19, may be made solid with the axle shaft or it may be made separate and put on and secured in any well known way. At the front of the bearing 19, is a rim-band 20, for securing and holding the projecting points $2^a$, of the tapering rollers. At the back of the bearing 19, is another rim band 21, for holding the points 2, of said tapering rollers, both rim-bands being constructed substantially the same as the rim-bands 12, and 14.

Between the two washers 22 and 23, is secured a felt washer 24, adapted to just fill the opening in the bearing case to keep the dust out and still allow the parts to turn easily therein.

I claim as my invention—

1. A roller bearing, consisting of a removable tapering nut having a surrounding depression forming a roller seat, a series of tapering rollers 1, having a retaining projection at each end adapted to fit in said seat, rim bands for keeping the rollers in place, and an outer bearing case, provided with a screw nut 10, for excluding the dust, forming the outer bearing, in combination with an inner bearing at the large end of the hub, consisting of a tapering portion $16^a$, a series of tapering rollers having retaining projections, rim bands for retaining them in place, and an outer bearing case, the two outer cases being retained in place in the hub by a connecting sleeve 7, secured rigidly to them, and a felt washer 24, for excluding the dust, located between two retaining washers 22 and 23, substantially as described.

2. A roller bearing, consisting of a removable tapering nut having a surrounding depression forming a roller seat, a series of tapering rollers having a retaining projection at each end adapted to fit in said seat, rim bands for keeping the rollers in place, and an outer bearing case, provided with a screw nut 10, for excluding the dust, forming the outer bearing, in combination with an inner bearing at the large end of the hub, consisting of a tapering portion $16^a$, a series of tapering rollers having retaining projections, rim bands for retaining them in place, and an outer bearing case, the two outer cases being retained in place in the hub by a connecting sleeve 7, secured rigidly to them substantially as described.

WILLIAM H. WRIGHT.

Witnesses:
JAMES SANGSTER,
HARRIET JOHNSON.